(12) United States Patent
Yamamoto et al.

(10) Patent No.: US 6,253,999 B1
(45) Date of Patent: Jul. 3, 2001

(54) ELECTRONIC MONEY SAFE USING LOGICAL IC CARDS

(75) Inventors: Koken Yamamoto; Shigeru Hashimoto, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/122,063

(22) Filed: Jul. 24, 1998

(30) Foreign Application Priority Data

Dec. 5, 1997 (JP) .................................................. 9-335267

(51) Int. Cl.$^7$ ...................................................... G06K 5/00
(52) U.S. Cl. ................................. 235/380; 235/379; 902/9
(58) Field of Search ................................. 235/380, 379, 235/492; 902/9, 22, 25, 26; 705/35

(56) References Cited

U.S. PATENT DOCUMENTS

| | | | |
|---|---|---|---|
| 5,461,217 | * 10/1995 | Claus | 235/380 |
| 5,590,200 | * 12/1996 | Nachman et al. | 380/46 |
| 5,825,876 | * 10/1998 | Peterson, Jr. | 705/52 |
| 5,835,700 | * 11/1998 | Carbonneau et al. | 395/183.2 |
| 5,854,891 | * 12/1998 | Postlewaite et al. | 713/202 |
| 6,032,858 | * 3/2000 | Yazumi et al. | 235/379 |
| 6,138,907 | * 10/2000 | Mori et al. | 235/379 |

FOREIGN PATENT DOCUMENTS

| | | |
|---|---|---|
| 0 769 767 A2 | 4/1997 | (EP) . |
| 0 778 550 A2 | 6/1997 | (EP) . |
| 0 810 564 A2 | 12/1997 | (EP) . |
| 407319982 | * 12/1995 | (JP) . |
| 409158569 | * 6/1997 | (JP) . |
| 411022305 | * 1/1999 | (JP) . |
| 411022306 | * 1/1999 | (JP) . |
| 411085929 | * 3/1999 | (JP) . |

* cited by examiner

*Primary Examiner*—Michael G. Lee
*Assistant Examiner*—Jared J. Fureman
(74) *Attorney, Agent, or Firm*—Armstrong, Westerman, Hattori, McLeland & Naughton, LLP

(57) ABSTRACT

In a non-volatile memory are arranged a plurality of IC card storage units corresponding to a plurality of IC cards each storing therein an electronic money representing the value of currency in the form of electronic information. A command control unit executes concurrently commands imparted to the plurality of IC card storage units arranged in the non-volatile memory to logically implement a control function of the plurality of IC cards. In addition, upon a receipt of a single or a plurality of commands from a host apparatus (a money server), a communication control unit forms concurrently communication paths corresponding in numbers to the commands and associated with the command control unit to logically implement a function of communication with the plurality of IC card storage units.

16 Claims, 16 Drawing Sheets

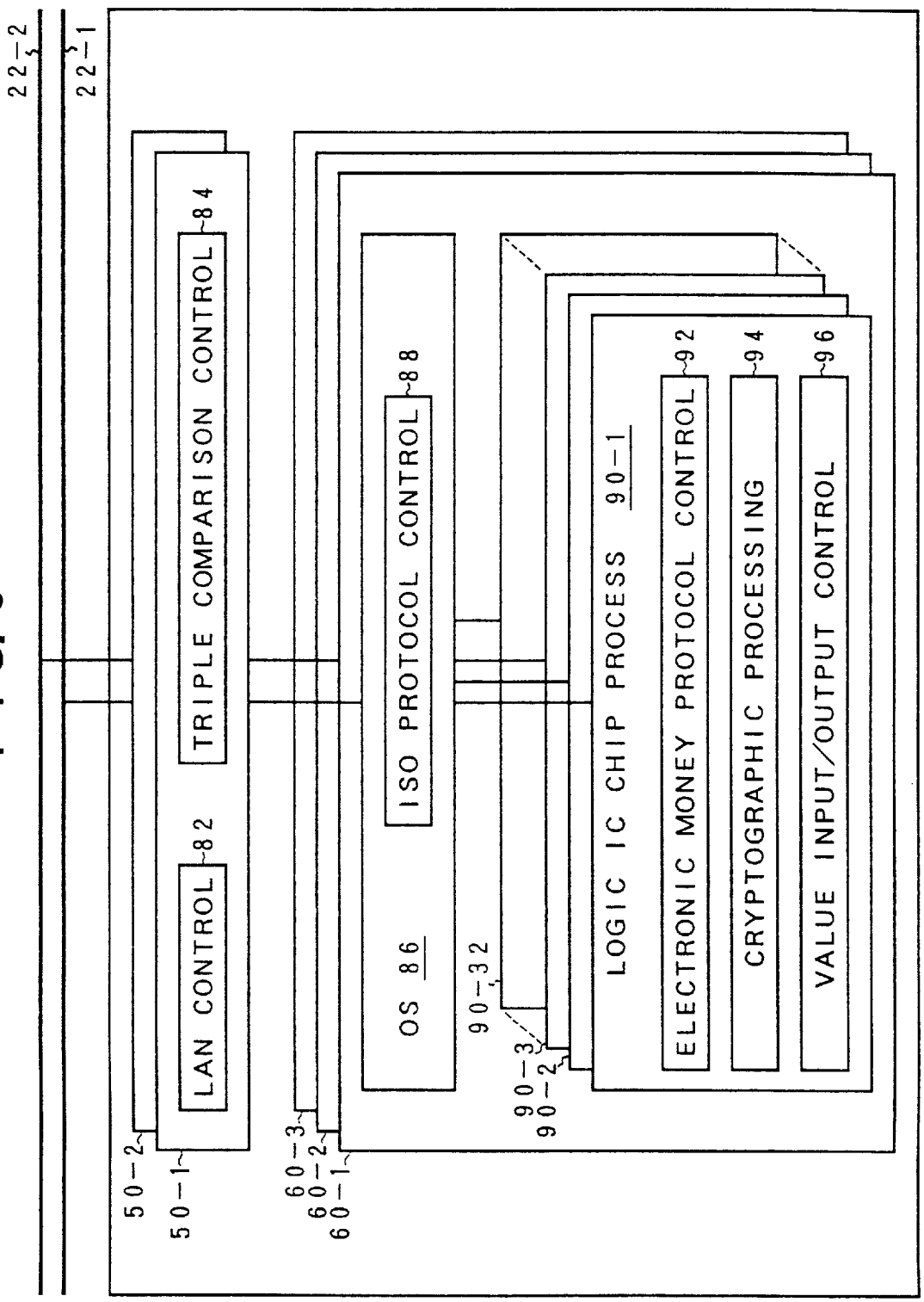

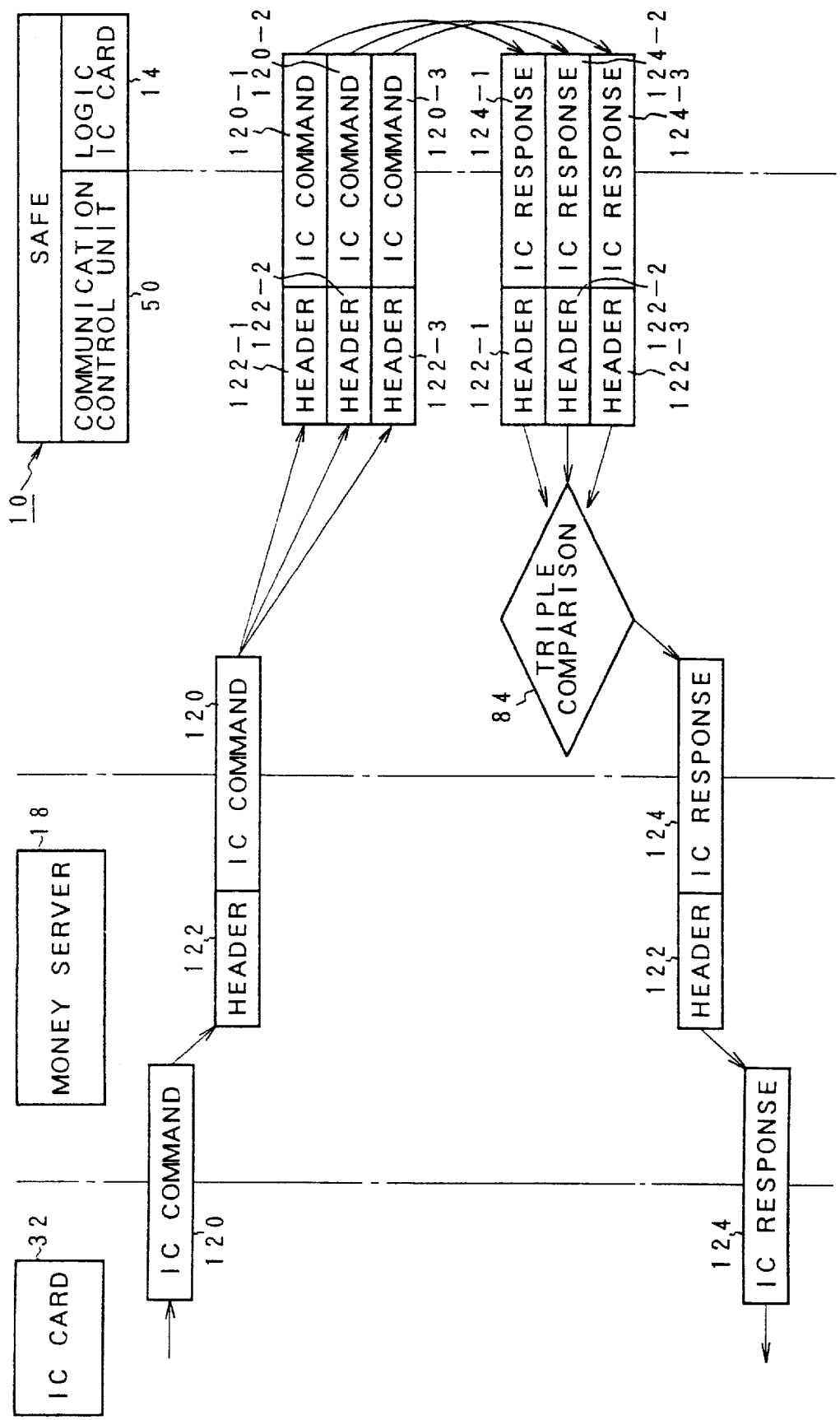

ELECTRONIC MONEY SAFE USING LOGICAL IC CARDS

BACKGROUND OF THE INVENTION

1. Field of the Invention

The present invention relates generally to an electronic money safe for collectively managing electronic money representative of currency values in the form of electronic information, and more particularly to an electronic money safe for use in a transaction using IC cards.

2. Description of the Related Art

From the viewpoint of safety and convenience of settlement in the transaction such as buying and selling, a notice is recently being given to so-called electronic money utilizing electronic digital data as cashes as settling means in place of the conventional paper money, coins, etc. For this reason, banks and the like need be provided with electronic money safes for collectively managing the electronic money, and hence desire a provision of highly reliable safes.

In the settlement using the conventional electronic money, in order to secure the security, an IC card stores therein, for example, digital data representative of the electronic money, programs for transferring the electronic money, and a cryptographic processing circuit for use in the value transfer. Thus, upon the transaction, a direct data exchange of the electronic money is effected between the IC card of the user and the IC card of the part having business relations therewith. The exchange of electronic money between the two IC cards applies also to the case where a customer uses a load terminal to load electronic money from the bank side into the IC card. In this case also, a direct exchange of electronic money must be effected between the IC card of the customer and the IC card on the bank side. For this reason, the bank side possesses IC cards exceeding the number of customers expected to transact at one time, thereby enabling a direct exchange of electronic money between the IC cards of the customers and the IC card of the bank to be performed in response to the load demands of the customer. In order to meet the need for exchange of electronic money with the IC cards of the customers in this manner, use has hitherto been made of an electronic money safe storing a multiplicity of IC cards therein.

However, the electronic money safe storing a multiplicity of IC cards therein has entailed the following deficiencies. First is a problem of changing work of the cryptographic processing. In the electronic money transaction, cryptographic processing is performed upon the transfer of the electronic money although the strength of the cryptogram tends to lower year by year due to the progress of the technology and so forth. For this reason, typically, there is a need to change the cryptographic processing every several years. However, the electronic money safe using the IC cards stores therein several tens to several thousands of IC cards, so that a multiplicity of IC cards must be replaced every time the cryptographic processing is changed.

Then there arises a problem of reliability of the IC cards. The reliability (failure rate) of the IC cards being currently used is of the order of 100 fit (100 times/ $10^9$H). Providing that 1000 IC cards are consecutively used for example, the failure frequency is given as 109/ 100×1,000=10,000 H (about 1.2 years)

This means that the value may possibly become extinct about once a year.

Furthermore, there also arises a problem of service life of the IC cards. The rewritable number of times of the IC cards being currently used is of the order of 100,000, so that if one IC card is used for the transaction once a minute, its service life is given as 100,000/ 60 (min/hour)=1,667 H (about 69 days)

This means that the IC cards must be replaced about once per two months.

SUMMARY OF THE INVENTION

According to the present invention there is provided an electronic money safe capable of simply dealing with a change in cryptographic processing and capable of fully ensuring a reliability and durability.

The electronic money safe of the present invention comprises a non-volatile memory, a command control unit and a communication control unit. In the non-volatile memory are arranged a plurality of IC card storage units corresponding to a plurality of IC cards storing therein electronic money representative of a currency value in the form of electronic information. The command control unit executes concurrently commands imparted to the plurality of IC card storage units arranged in the non-volatile memory to thereby logically implement a function of control of a plurality of IC cards. Upon a receipt of a single or a plurality of commands from a host apparatus, the communication control unit forms concurrently communication paths corresponding in numbers to the commands and extending to the command control unit to thereby logically implement a function of communication with the plurality of IC cards. By logically implementing the function of a plurality of IC cards by use of a single command control unit and non-volatile memory in this manner, an easy change is achieved in the case of change in cryptographic processing for use in securing the security of the electronic money, without any need for a replacement work of a multiplicity of physical IC cards.

The non-volatile memory is comprised of a memory backed up by a battery, for example, a static RAM (SRAM). For this reason, the service life can be remarkably elongated as compared with a conventional IC card using a flash memory. The electronic money safe of the present invention further comprises a plurality of trays each having a multiplex configuration in which a plurality of value control units are provided for the communication control unit, the plurality of value control units each consisting of a combination of the non-volatile memory and a command control unit. The communication control unit includes a multi-comparison control unit which allows the command control units provided in the plurality of value control units to perform the same processing for the IC card storage units in response to commands from the host apparatus, the multi-comparison control unit comparing a plurality of results of processing for judgment. By multiplexing the electronic money safe of the present invention in this manner, a reliability can remarkably be improved as compared with the case where the IC cards have been stored.

When comparing the results of processing from the plurality of value control units and detecting that all of them are coincident with one another, the multi-comparison control unit judges normal termination and posts the host apparatus on the results of processing. When comparing the results of processing from the plurality of value control units and detecting a partial non-coincidence, the multi-comparison control unit posts the host apparatus on results of processing which have coincided with each other. When comparing the results of processing from the plurality of value control units and detecting a partial non-coincidence, that is, a non-coincidence of one result of processing with the other results of processing, the multi-comparison control unit inhibits a control (a new transaction) on the value control unit which has caused non-coincidence. When comparing the results of processing from the plurality of value control units and detecting a partial non-coincidence, the multi-comparison control unit inhibits a control from the host apparatus on a tray containing the value control unit which has caused non-coincidence, and thereafter, under the control of the host apparatus, transfers electronic money stored in the non-volatile memory of the abnormal tray to the non-volatile memory of the other normal tray. By detecting a defectiveness at a part of the multiplex configuration and transferring the electronic money to the other tray in this manner, an extinction of the electronic money attributable to the multi-failures can be prevented in advance. In addition, by transferring the electronic money stored in the non-volatile memory of the abnormal tray to the non-volatile memory of the other normal tray, it becomes possible to perform the replacement and repair of the tray which has suffered from the abnormality.

When comparing the results of processing from the plurality of value control units and detecting that all of them are not coincident with one another or detecting at least three different results of processing, the multi-comparison control unit judges abnormal termination and posts the host apparatus on a processing error. Herein, the case where at least three different results of processing have been detected of the results of processing of the plurality of value control units means the case where for example five results of processing are obtained and the contents have become (A, A, C, B, B). When comparing the results of processing from the plurality of value control units and detecting that all of them are not coincident with one another or detecting at least three different results of processing, the multi-comparison control unit judges abnormal termination, posts the host apparatus on multi-failure information and severs a tray which has suffered from abnormality from objects to be processed. When comparing the results of processing from the plurality of value control units and detecting that all of them are not coincident with one another or detecting at least three different results of processing, the multi-comparison control unit causes the plurality of value control units to perform self-diagnosis to judge a correct result of processing, posts the host apparatus on the correct result of processing and on multi-failure information and severs a tray which has suffered from abnormality from objects to be processed. From the judgment of the correctness by this self-diagnosis, the effectiveness of the processing data is ensured as much as possible. The multiplex configuration can be for example tripled configuration. More specifically, it further comprises a plurality of trays each having a tripled configuration in which three value control units are provided for the communication control unit, the three value control units each consisting of a combination of the non-volatile memory and a command control unit. The communication control unit includes a triple-comparison control unit which allows the command control units provided in the plurality of value control units to perform the same processing for the IC card storage units in response to commands from the host apparatus, the triple-comparison control unit comparing a plurality of results of processing for judgment. The detail of this tripled configuration is equivalent to the multiplex configuration.

BRIEF DESCRIPTION OF THE DRAWINGS

FIG. 5 is a block diagram of a program module for use in the tray within the safe of FIG. 3;

FIG. 7 is an explanatory diagram of a processing sequence of the electronic money system of FIG. 1 using the electronic money safe of the present invention;

DETAILED DESCRIPTION OF THE PREFERRED EMBODIMENTS

Figure 1:
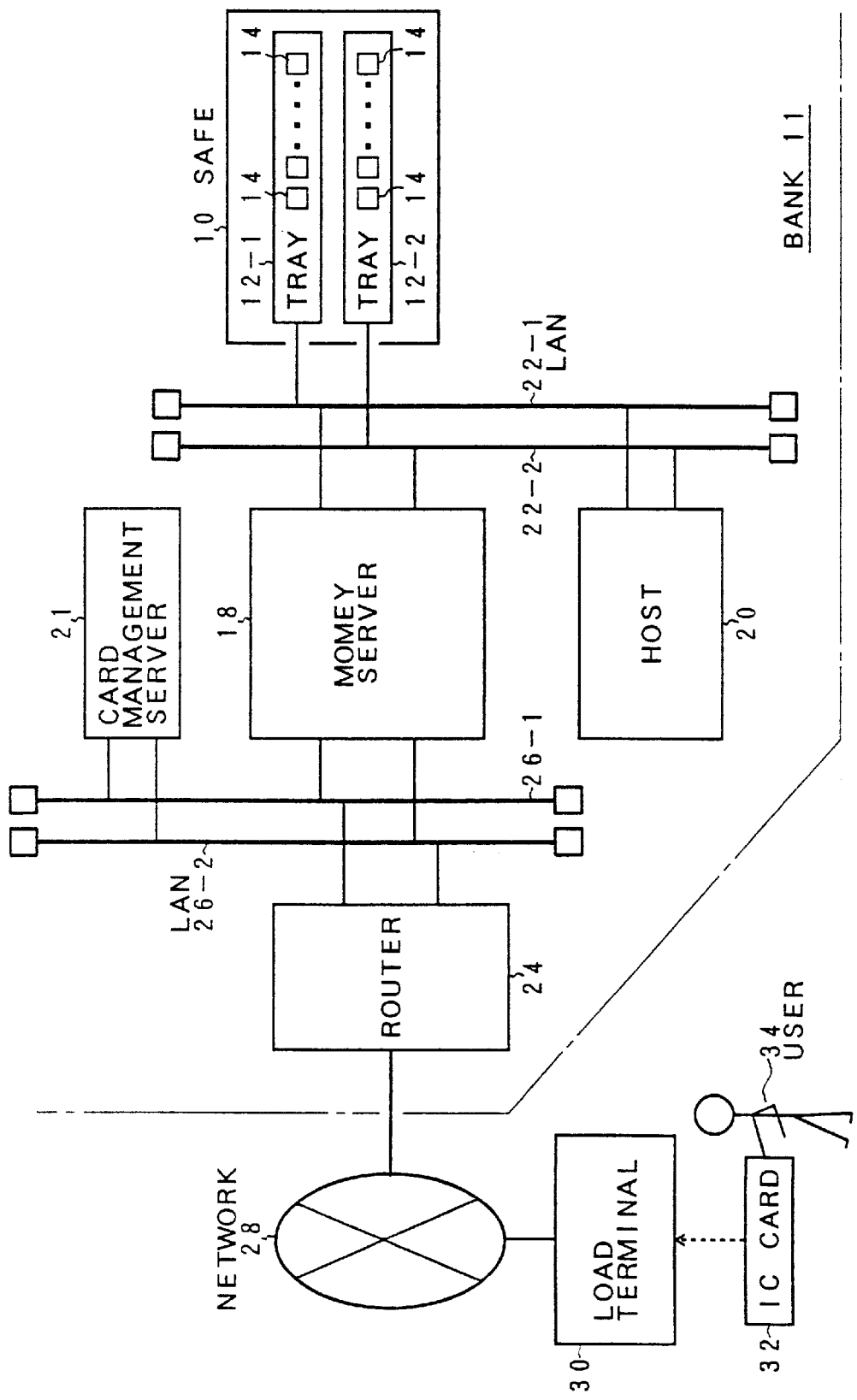
FIG. 1 is an explanatory diagram of an electronic money system using a safe in accordance with the present invention.

FIG. 1 is a system configuration diagram of an electronic money system in which is used an electronic money safe in accordance with the present invention. A bank 11 side is provided with an electronic money safe 10, a money server 18, a host 20 and a router 24. The electronic money safe 10 is connected via LANs 22-1 and 22-2 to the money server 18, with the host 20 and a card management server 21 being connected to LANs 26-1 and 26-2. The money server 18 is connected via the LANs 26-1 and 26-2 to the router 24. The router 24 on the bank 11 side is connected to an external network 28 to which a load terminal 30 is connected so as to allow an electronic money transaction with the money server 18 on the bank 11 side using an IC card 32 which a user 34 possesses. The transaction through the load terminal 30 using the IC card 32 possessed by the user 34 is carried out in accordance with the following procedure.

I. The user 34 sets the IC card 32 on the load terminal 30 and enters transaction codes, for example, an electronic money load, a code number and an amount.

II. The load terminal 30 makes a demand for transaction on the electronic money safe 10 by way of the money server 18.

III. In response to the demand for transaction from the load terminal 30, the electronic money safe 10 makes an authentication request on the load terminal 30 for verifying the correctness of the IC card 32 of the user 34.

IV. In response to the authentication request, the load terminal 30 returns an authentication response indicative of the correctness of the IC card 32 of the user 34.

V. When the electronic money safe 10 receives the authentication response from the load terminal 30, it performs an authentication approval and posts the money server 18.

VI. The money server 18 makes a demand for an account number, etc., on the card management server 21 for converting the number of the IC card 32 to the bank account number possessed by the user 34.

VII. In response to the demand for the account number, etc., from the money server 18, the card management server 21 returns a response indicative of the account number, etc., as the result of the conversion.

VIII. The money server 18 sends to the host 20 a transaction telegram for updating a ledger.

IX. The host 20 updates the ledger on the basis of the transaction telegram from the money server 18 and returns a transaction telegram indicative of the result to the money server 18.

X. The money server 18 makes a demand for value transfer on the electronic money safe 10.

XI. A value transfer, that is, an electronic money transfer is carried out between an IC card of the electronic money safe 10 and an IC card of the user 34.

XII. Finally, with the completion of transfer of the electronic money safe 10, the load terminal 30 receives a transaction verification attendant on the completion of the transaction from the money server 18.

Such an electronic money safe 10 of the present invention for use in the electronic money system using the IC card 32 has trays 12-1 and 12-2 for example. The trays 12-1 and 12-2 are each provided with 32 logic IC cards 14, each of which logically implements by software the same function as that of the IC card 32 possessed by the user 34.

Figure 2:
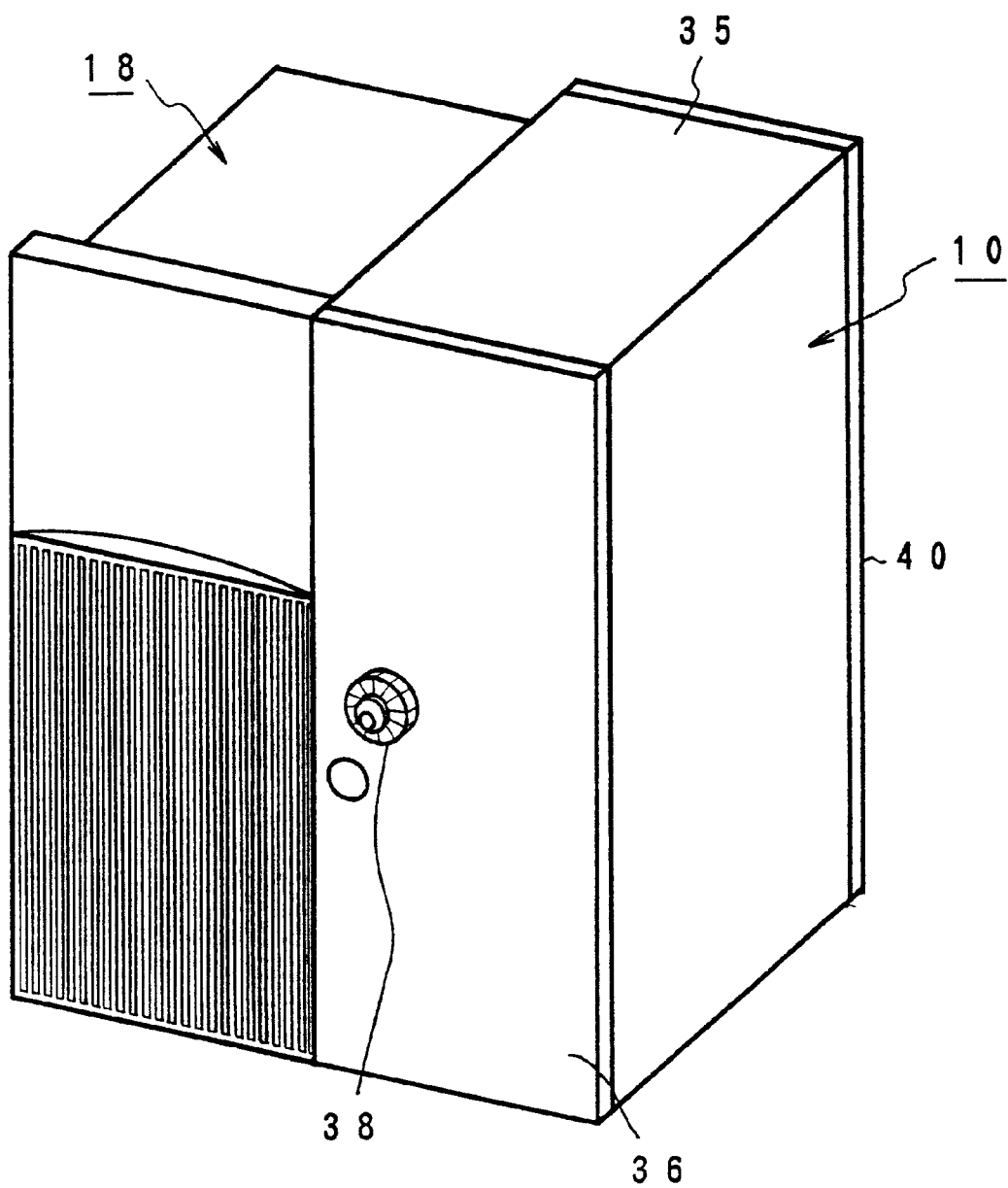
FIG. 2 is an explanatory diagram of an external appearance of an electronic money safe and a money server of the present invention.

FIG. 2 illustrates the external appearance of the electronic money safe 10 of the present invention together with the money server 18. The electronic money safe 10 of the present invention is provided in conjunction with the money server 18 and includes a body 35, a front door 36 and a rear door 40. The front door 36 is provided with a dial lock 38 adapted to open the front door by setting predetermined dial numbers. The rear door 40 is fitted with a cylinder lock.

Figure 3:
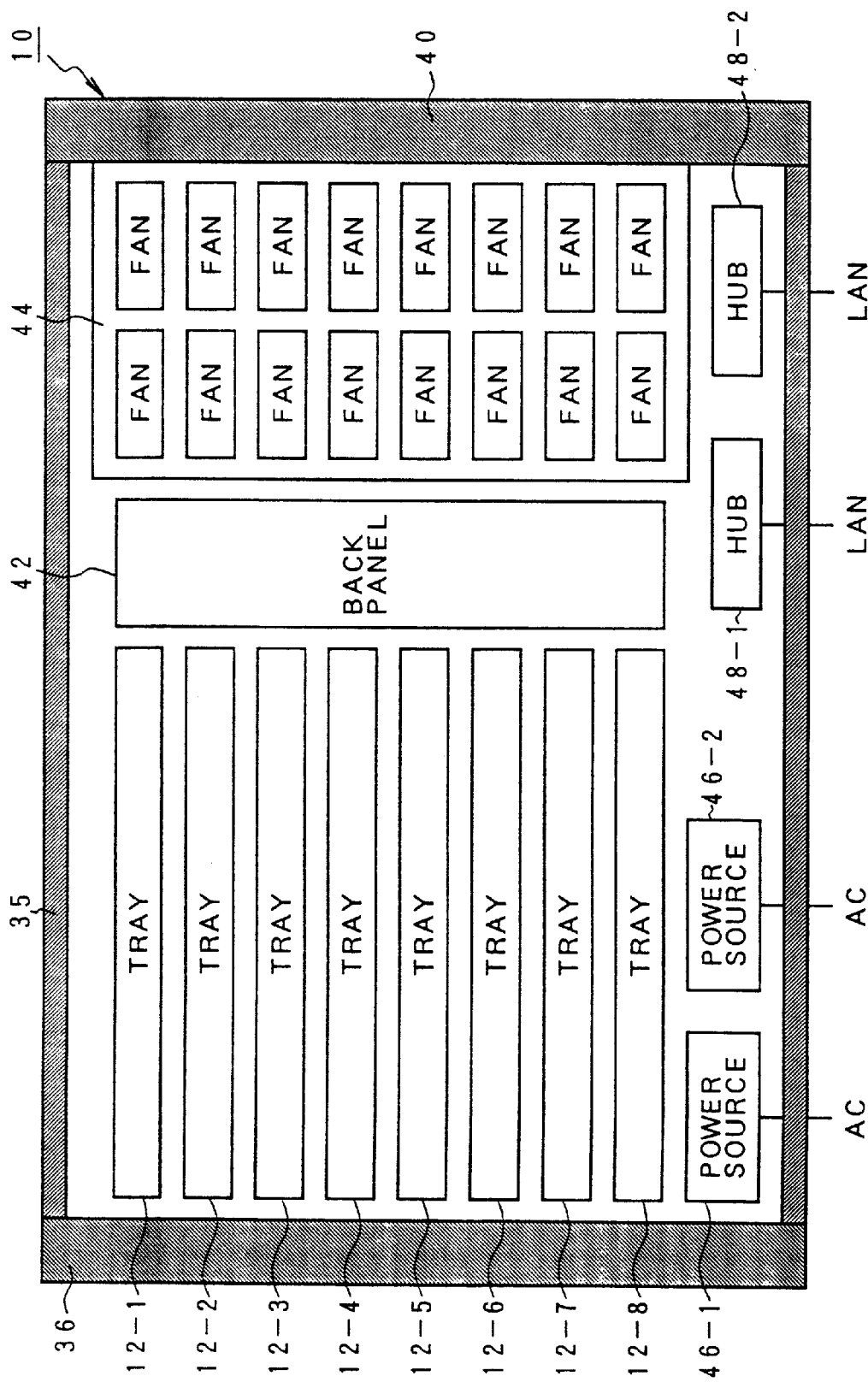
FIG. 3 is an explanatory diagram of an internal structure of the electronic money safe of FIG. 2.

FIG. 3 is a sectional view of an internal structure of the electronic money safe 10 of FIG. 2. The body 35 of the electronic money safe 10 is covered with an iron plate having a thickness of 13 millimeters for instance. The front door 36 is provided at the front of the body 35 and the rear door 40 is provided at the rear thereof. In the case of this embodiment, the interior of the body 35 accommodates eight trays 12-1 to 12-8 in its maximum configuration. For the trays 12-1 to 12-8 there is provided a back panel 42 serving as a common circuit board. Behind the back panel 42 are provided fan units 44 each consisting of two fans which are associated with each of the trays 12-1 to 12-8. At the bottom of the body 35 are further provided dualized power source units 46-1 and 46-2 as well as similarly dualized hubs 4801 and 48-2 for LAN.

Figure 4:
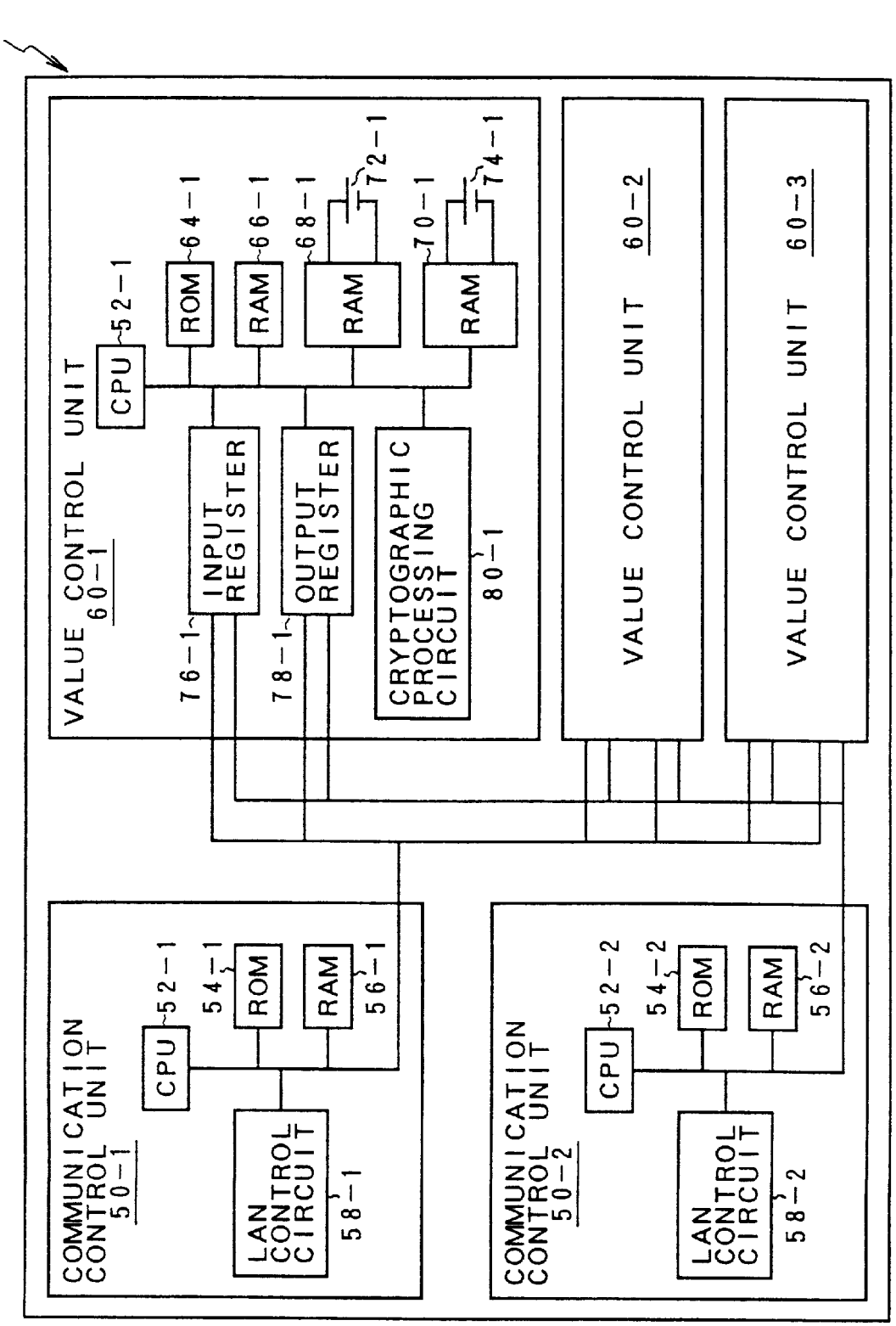
FIG. 4 is a circuit block diagram of a tray within the safe of FIG. 3.

FIG. 4 illustrates a circuit block of the tray 12-1 representative of the seven trays stored in the electronic money safe 10 of FIG. 3. The tray 12-1 includes dualized communication control units 50-1 and 50-2 and tripled value control units 60-1, 60-2 and 60-3. In the case of the communication control unit 50-1 for example, of the communication control units 50-1 and 50-2, it includes a CPU 52-1, a ROM 54-1, a RAM 56-1 and a LAN control circuit 58-1. The LAN control circuit 58-1 has a 100Mbit/s 100BASE-TX specification for instance, and using a TCP/IP protocol it performs a communication with the money server 18 of FIG. 1 by way of the hubs 48-1 and 48-2 provided in the safe of FIG. 3. The CPU 52-1 acts as a processor for providing a control of the LAN control circuit 58-1 and a control of the tripled value control units 60-1 to 60-3. A program for the CPU 52-1 is stored in the ROM 54-1, with the RAM 56-1 being provided as a working memory. The configuration and function of the communication control unit 50-1 applies to the communication control unit 50-2. The tripled value control units 60-1 to 60-3 are each provided with a circuit block which is typically shown in the case of the value control unit 60-1 for instance. The value control unit 60-1 comprises a CPU 62-1, a ROM 64-1, a RAM 66-1, a RAM 68-1 backed up by a battery 72-1 to function as a non-volatile memory, a RAM 70-1 similarly backed up by a battery 74-1 to function as a non-volatile memory, an input register 76-1, an output register 78-1 and a cryptographic processing circuit 80-1. Using the input register 76-1 and the output register 78-1, data transmission and reception is carried out between the value control unit 60-1 and the communication control unit 52-1 or the communication control unit 50-2. The cryptographic processing circuit 80-1 is a circuit for performing RSA cryptographic processing known as a public key of cryptograph, and using a maximum 1028-bit key of cryptograph (e) and a parameter (k) it performs a conversion from 1028-bit data x to data y on the basis of $$y = x ** e \ (mod \ k)$$

This cryptographic processing prevents duplication of the electronic money and so forth. Naturally, it is also possible for the cryptographic processing circuit 80-1 to deal with other cryptographic processing such as an elliptic curve encryption with the development and research of the cryptographic processing. By employing a high-performance CPU 62-1, it is also possible for the software of the CPU 62-1 to solely perform the cryptographic processing without using a specific circuit as the cryptographic processing circuit 80-1. Encrypted electronic money information, transaction log, error information, etc., are stored in the RAM 70-1 functioning as a non-volatile memory with the backup of the battery 74-1. As regards the electronic money information stored in the SRAM 68-1, arranged in the memory area are logic IC card storage units corresponding in numbers to the IC cards logically implemented in the value control unit 60-1, for example, 32 logic IC card storage units corresponding to 32 logic IC cards. In this manner, the RAM 70-1 having a plurality of card storage units for logic IC cards stored therein makes use of a static RAM (SRAM) based on C-MOS technology, so that even though a power supply to the electronic money safe 10 has been shut down, only a very minute current is needed to hold the contents of memory, thereby ensuring the holding of the content of memory during ten years or more by use of a single battery as the battery 74-1. In the case of using two 128K×9-bit static RAMs which is typical as the RAM 70-1, the current required for the backup is of the order of 16 $\mu$A. In cases where the backup is made by a lithium battery having a capacity of 1,900mAH, the service life is given as $$1,900\text{mAH} / (0.016\mu\text{A} \times 24\text{H} \times 365\text{days}) = 13.6 \ \text{years}$$

This is a remarkably elongated service life as compared with about two months of service life of the conventional IC card using the flash memory. The RAM 68-1 functioning as a non-volatile memory by the backup with the battery 72-1 stores therein a security program defining a secret key for encrypting an electronic money and a secret key processing procedure. Although the conditions on the holding of the contents of memory in case a power supply has been shut down are the same as the RAM 70-1 storing the information of the electronic money, the contents of the RAM 68-1 can automatically be erased by detecting the abnormality such as unjust opening of the front door 36 or the rear door 40 of the electronic money safe 10. Such a function erasing the contents of the RAM 68-1 upon the occurrence of abnormality makes it possible to prevent a leak of a secret key for encryption or a security program. The CPU 62-1 is a processor for performing overall processing of the value control unit 60-1. An operating system and programs other than the security program are stored in the ROM 64-1, and the RAM 66-1 is used as a working memory. The configuration and function of such a value control unit 60-1 are the same as those of the other value control units 60-2 and 60-3.

FIG. 5 illustrates a software configuration of the dualized communication control units 50-1 and 50-2 of FIG. 4 and the tripled value control units 60-1 to 60-3. As shown in the communication control unit 50-1, the dualized communication control units 50-1 and 50-2 comprise a LAN control module 82 which is a program for providing a control of a TCP/IP protocol, and a triplication control module 84 which is a program for providing a comparison control of the results of processing by simultaneously passing commands from the money server acting as a host apparatus to the three value control units 60-1 to 60-3. As shown in the value control unit 60-1 in a representative manner, the tripled value control units 60-1 to 60-3 comprise an ISO protocol control module 88 which is a program providing a logic protocol of the IC card in conformity with the IS7816 which is an international standard of the IC card, logic IC card processes 90-1 to 90-32 for providing functions of 32 IC cards at maximum for the electronic money, and an operating system (OS) 86 for executing a plurality of processes concurrently. As shown in the logic IC card process 90-1 in a representative manner, the logic IC card processes 90-1 to 90-32 include an electronic money protocol control module 92 which is a program for the control of a command/response particular to the electronic money, a cryptographic processing module 94 which is a program for controlling the cryptographic processing circuit 80-1 of FIG. 4 to perform encryption/ decryption of the electronic money data and so forth, and a value input/output control module 96 which is a program for performing input/ output of electronic money digital data from/ to 32 IC card storage units at maximum arranged in the battery backed-up RAM 68-1.

Figure 6A:
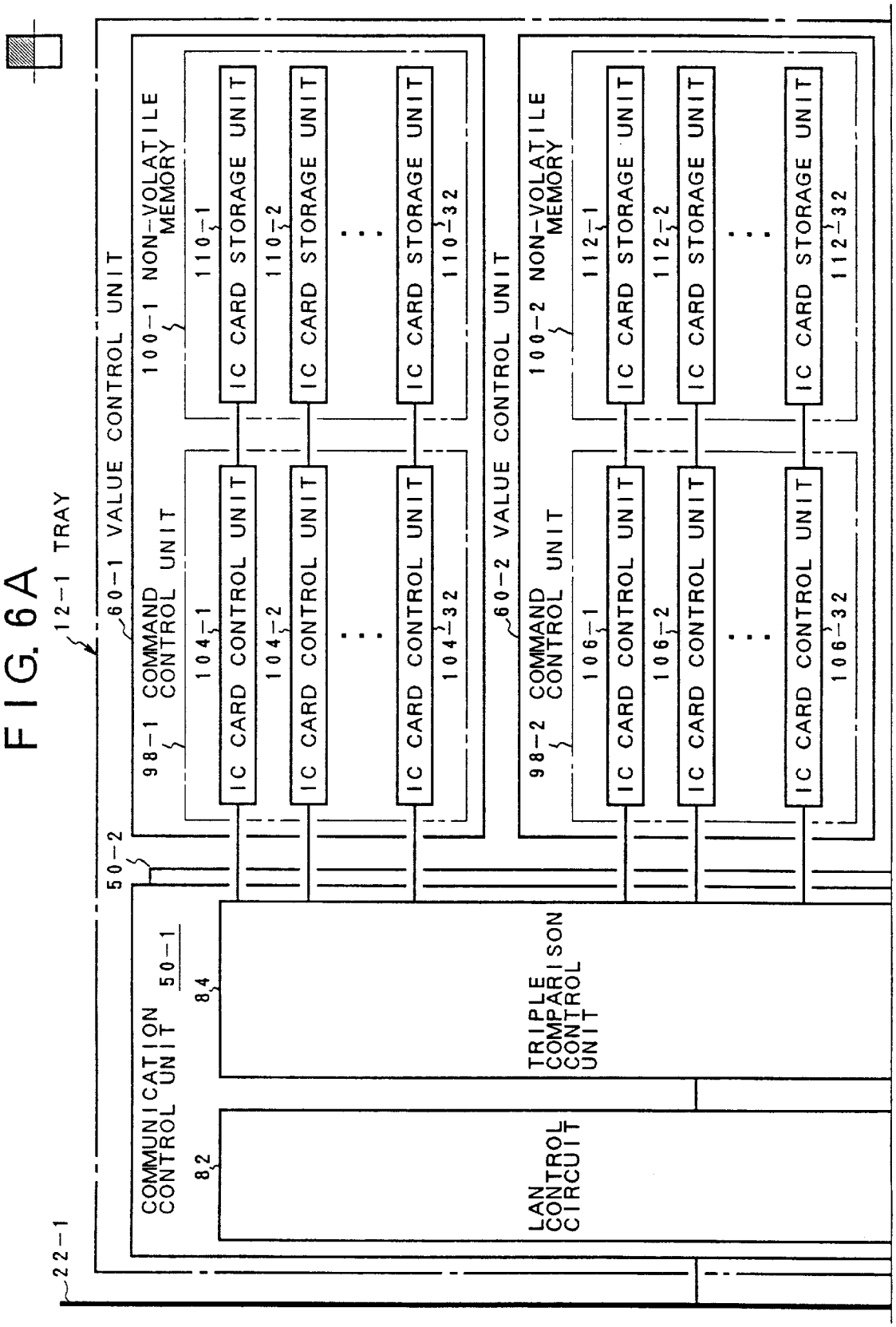
FIGS. 6A and 6B are block diagrams of control function of the tray within the safe of FIG. 3.
Figure 6B:
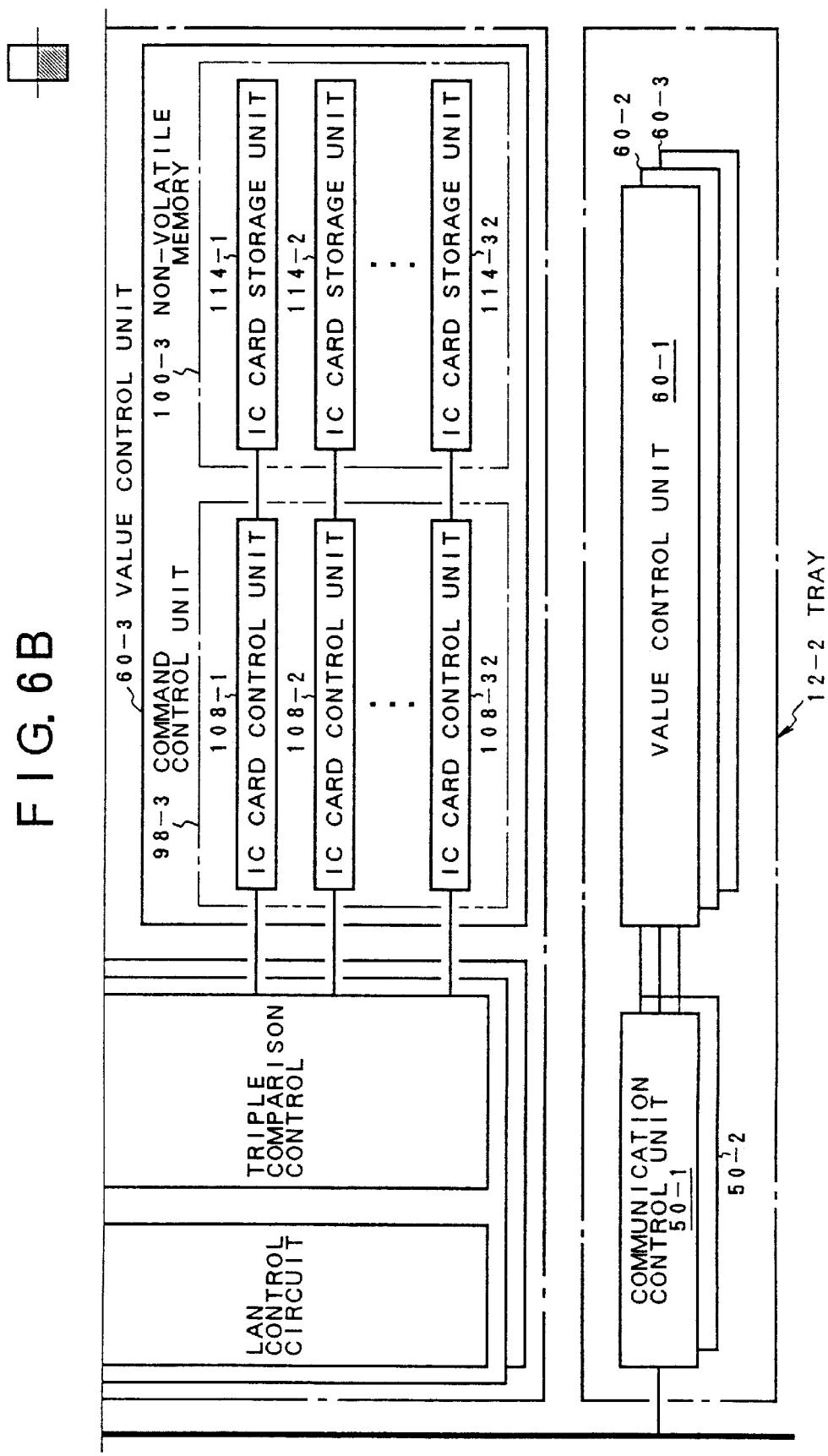

FIGS. 6A and 6B are function block diagrams of the electronic money safe of the present invention which is implemented by the hardware configuration of FIG. 4 and the software configuration of FIG. 5 in the case of the trays 12-1 and 12-2 of FIG. 3 by way of example. The tray 12-1 is provided with the dualized communication control units 50-1 and 50-2 which, as shown in the communication control unit 50-1 in a representative manner, include a LAN control circuit 82 and a triple comparison control unit 84. In this case, the LAN control circuit 82 provides a function corresponding to a control function of the LAN control circuit 58-1 by the LAN control module 82 of FIG. 5. The triple comparison control unit 84 is the triplication control module 84 itself of FIG. 5. In contrast with such communication control units 50-1 and 50-2, the tripled value control units 60-1 to 60-3 are provided with pairs of command control units 98-1, 98-2 and 98-3 and non-volatile memories 100-1, 100-2 and 100-3. In the case of the command control unit 98-1 by way of example, the command control units 98-1 to 98-3 are provided with 32 IC card control units 104-1 to 104-32 at maximum. These IC card control units 104-1 to 104-32 are implemented by the logic IC card processes 90-1 to 90-32 of FIG. 6. The non-volatile memory 100-1 is provided with 32 IC card storage units 110-1 to 110-32 at maximum. The non-volatile memory 10-1 is implemented by the RAM 70-1 backed up by the battery 74-1 of FIG. 4. The pairs of the IC card control units 104-1 to 104-32 provided in the command control unit 98-1 and the IC card storage units 110-1 to 110-32 provided in the non-volatile memory 100-1 implement functions of 32 logic IC cards in the maximum configuration. The configuration of the value control unit 60-1 applies to the other value control units 60-2 and 60-3. In the same manner as the tray 12-1, the tray 12-2 is also provided with dualized communication control units 50-1 and 50-2, and tripled value control units 60-1 to 60-3, of which configurations and functions are the same as those of the tray 12-1 side. On the basis of a command from the money server as the host apparatus by way of the LAN control circuit 82, the triple comparison control unit 84 provided in the communication control unit 50-1 of the tray 12-1 specifies a pair of the IC card control unit and the IC card storage unit in each of the value control units 60-1 to 60-3 to cause them to execute the same control processing, and on the basis of the result of response it takes action based on the decision by majority. For example, the triple comparison control unit 84 causes the pair of the IC card control unit 104-1 and the IC card storage unit 110-1 of the value control unit 60-1, the pair of the IC card control unit 106-1 and the IC card storage unit 112-1 of the value control unit 60-2, and the pair of the IC card control unit 108-1 and the IC card storage unit 114-1 of the value control unit 60-3 to execute control processing based on the same command to obtain a result of processing.

FIG. 7 illustrates a control sequence of the transaction in the electronic money system using the electronic money safe 10 of the present invention, in which transaction the user 34 loads an electronic money from the electronic money safe 10 into the IC card 32 by use of the load terminal 30 of FIG. 1 for instance. When the user sets the IC card 32 onto the load terminal to perform operation processing in conformity with the predetermined transaction procedure, an IC command 120 for loading the electronic money is sent from the load terminal side to the money server 18. When the money server 18 receives the IC command 120 for the load of the electronic money, it selects an appropriate tray number and a logic IC card number from a cash load amount by the IC command 120 and from the balance of the logic IC card within each tray of the electronic money safe 10, adds the tray number and the logic IC card number as the header information 122 to the IC command 120, and sends it to the communication control unit 50 of the tray specified by the tray number of the electronic money safe 10. On the basis of the header information 122 and the IC command 120 received from the money server 18, the communication control unit 50 sends simultaneously pairs of header information 122-1 to 122-3 and IC commands 122-1 to 122-3 to the three value control units 60-1 to 60-3, respectively. The command control modules 98-1 to 98-3 in FIG. 7 of the three value control units 60-1 to 60-3, more specifically the ISO protocol control module 88 interprets received IC commands 120-1 to 120-3 and performs the same processing as that performed by the ordinary IC card. That is, in the case of the ordinary IC card, the value information in the form of the electronic money digital data is stored in the E2 PROM of the IC card, whereas in the present invention it is prepared in the form of 32 IC card storage units in the non-volatile memories 100-1 to 100-3 of FIGS. 6A and 6B for instance within the RAM 70-1 backed up by the battery 74-1, that is, within the static RAM as shown in FIG. 4. As a result of this, speed of access to the non-volatile memory using the static RAM is high, and extremely elongated service life is ensured since it has no restriction in the number of times of rewriting. At that time, in cases where cryptographic data attend the IC commands 120-1 to 120-3 as in a remittance for the load of the electronic money, the cryptographic processing module 94 in the logic IC card 90-1 of FIG. 5 controls the cryptographic processing circuit 80-1 in the hardware configuration of FIG. 4 to perform the encryption or decryption. It is natural that this encryption and decryption can be implemented by the software by the CPU. The tripled value control units 60-1 to 60-3 return as IC responses 124-1, 124-2 and 124-3 to the communication control unit 50 by way of the output register the result of processing of the logic IC card process 90-1, that is, the result of processing of the IC card control units 104-1, 106-1 and 108-1 provided in the command control units 98-1 to 98-3 for example of FIG. 6. In the triple comparison unit control module 84, the communication control unit 50 waits until all of the three responses 124-1 to 124-3 are obtained to compare them. In case all of the three responses 124-1 to 124-3 have coincided with one another, a normal termination code is added to the header information 122, which is returned to the money server 18 together with the IC response 124. The money server 18 interprets the header information 122 of the returned IC response 124, and if normal termination, it sends the IC response 124 cleared of the header information 122 to the IC card 32 set on the load terminal. This allows an implementation of a logical action as if an actual IC card exists on the electronic money side 10 when viewed from the IC card 32 possessed by the user. On the contrary, in case only one of the three IC responses 124-1 to 124-3 is non-coincident, for example, only the IC response 124-3 is not coincident with the other IC responses 124-1 and 124-2 in the triple comparison control module 84 provided in the communication control unit 50 of the electronic money safe 10, the value control unit 60-3 which has returned the IC response 124-3 is judged abnormal, and the value control unit 60-3 which has been judged abnormal is severed. This allows the subsequent processing to be switched from triplication processing to dualization control. At the same time, the number of the value control unit 60-3 which has been judged abnormal is added to the header information 122, and the same IC response 124 as the two IC responses 124-1 and 124-2 coincident with each other is returned to the money server 18. The money server 18 interprets the thus returned header information 122, and if only one value control unit 60-3 is abnormal, removes the header information 122 in the same manner as the case of the normal termination, and sends the IC response 124 to the IC card 32 on the user side. Then, in this case, any subsequent new transaction is inhibited at the tray provided with the value control unit 60-3 in which abnormality has occurred. After the inhibition of the new transaction of the tray in which abnormality has occurred, the money server 18 then executes processing for transferring value information within all the logic IC cards in the tray in which abnormality has occurred to the logic IC cards in the other normal trays, thereby rendering the tray in which abnormality has occurred capable of maintenance and replacement. Naturally, upon the completion of the transfer of the value information from the abnormal tray to the normal tray, the money server 18 displays an error message urging the user to perform the maintenance and replacement. In response to this, the maintainer replaces the tray which has suffered from abnormality. Furthermore, if all of the three IC responses 124-1 to 124-3 are non-coincident with one another in the triple comparison control module 84 provided in the communication control unit 50 of the electronic money safe 10, all of the three value control units 60-1 to 60-3 which have caused non-coincidence are severed and multi-failure information indicating that all the results of the value control units 60-1 to 60-3 are not coincident with one another is added to the header information 122, which is returned to the money server 18. The money server 18 judges the header information 122 returned from the electronic money safe 10, and when recognizing that all of the three IC responses 124-1 to 124-3 are not coincident with one another from the multi-failure information, it creates an error response which is sent as the IC response 124 to the user IC card 32 on the load terminal side, thereby inhibiting the subsequent new transaction at the tray provided with the value control units 60-1 to 60-3 which have caused non-coincidence of all of the three responses. It becomes impossible in this case for the money server 18 to fetch the electronic money which is the value information on the logic IC card lying within the tray which has suffered from abnormality. However, the RAM 70-1 of FIG. 4 having the electronic money as the value information stored therein is backed up by the battery 74-1, so that the tray which has suffered from abnormality can be removed from the electronic money safe 10 and sent to the factory and so forth, where data of the electronic money which is the value information is fetched from the logic IC card lying within the tray which has suffered from abnormality. From information such as check data added to the electronic money or transaction log acquired by the money server 18, it can be judged which value information is correct among the three value control units 60-1 to 60-3, thereby enabling even the tray which has suffered from abnormality to be saved from the extinction of the value. As other measures in the case of non-coincidence of all of the three results of the value control units 60-1 to 60-3, the communication control unit 50 issues a self-diagnostic command to the three value control units 60-1 to 60-3, thereby allowing the value control units 60-1 to 60-3 to perform self-diagnosis and correctness check of the RAMs 66-1, 68-1 and 70-1 of FIG. 4. From the result of this self-diagnosis, a value control unit having correct value information may be determined, and the IC response 124 which is a correct state result may be returned to the money server 18 together with the header information 122 having multi-failure information added thereto. In the money server 18, the IC response 124 may be cleared of the header information 122 and sent as the IC response 124 to the IC card 32 in the same manner as the case of normal termination. Naturally, in this case as well, the money server 18 inhibits the subsequent new transaction at the tray which has suffered from abnormality, and sends the tray which has suffered from abnormality to the factory and so forth for effecting measures for failure to fetch the value therefrom.

Figure 8A:
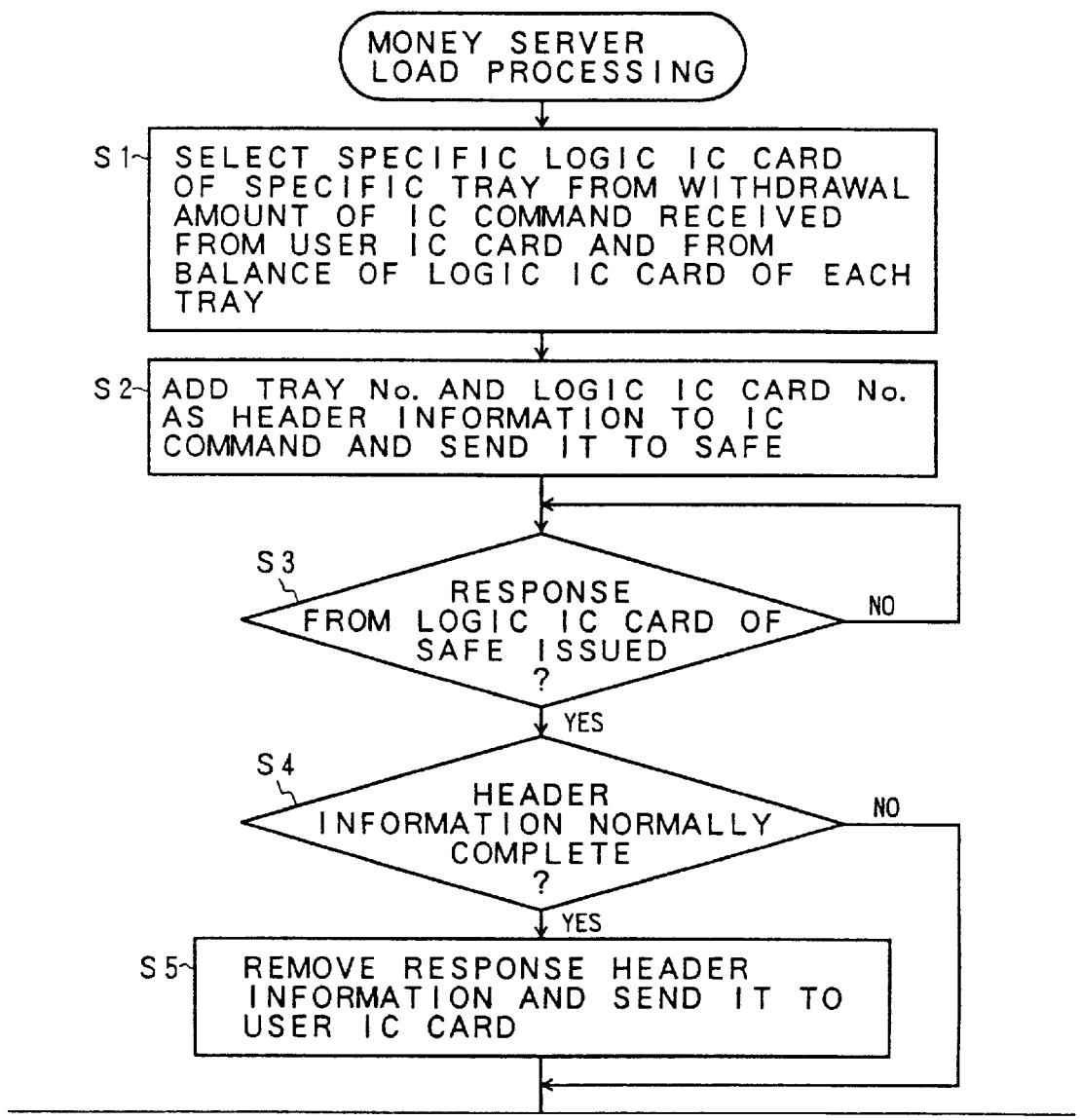
FIGS. 8A and 8B are flowcharts of load processing of the electronic money effected by the money server of FIG. 1.
Figure 8B:
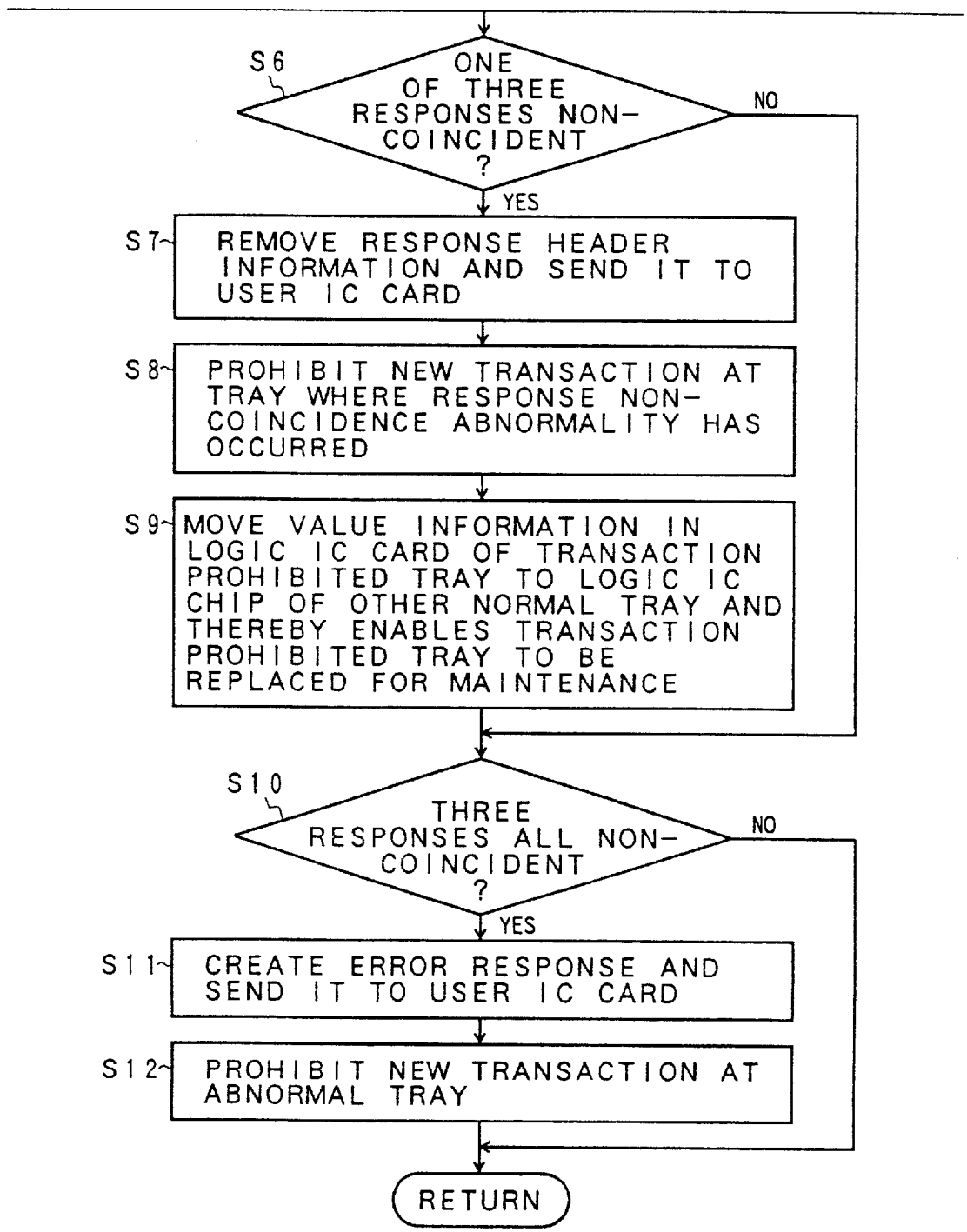

FIGS. 8A and 8B are flowcharts of the electronic money withdrawal processing by the money server 18 of FIG. 7. First in step S1, selection is made of a specific logic IC card of a specific tray from the withdrawal amount of the IC command 120 received from the user IC card 32 and from the balance of the logic IC card of each tray. Then in step S2, the tray number and the logic IC card number are added as header information 122 to the IC command 120 and sent to the electronic money safe 10. Then in step S3, a check is made to see if a response from the electronic money safe 10 is present or absent, and if the response is present, it is judged in step S4 whether a normal termination has occurred or not depending on whether the header information 122 is provided with a normal termination code. If it is judged that the normal termination has occurred, the header information 122 is removed and the IC response 124 is sent to the IC card of the user. If in step S4 no normal termination has occurred, then the procedure goes to step S6 in which a check is made to see if one of the three responses is not coincident with the others or not. If one of the three responses is not coincident with the others, then in step S7 the header information is removed and the IC response 122 is sent to the IC card 32 of the user in the same manner as the case of the normal termination. Then in step S8, a new transaction is inhibited at a tray in which abnormality of non-coincidence of response has occurred. Then in step S9, the value information within the logic IC card provided in the transaction inhibited tray is transferred to logic IC card of the other normal tray, rendering the transaction inhibited tray capable of maintenance and replacement. On the other hand, if in step S6 one of the three responses is not non-coincident, then in step S10 a check is made to see if all of the three responses are non-coincident with one another or not. If all of the three responses are non-coincident with one another, then in step S11 an error response based on the multi-failure information is created as the IC response 124 and is sent to the IC card 32 of the user. Then in step S12 a new transaction is inhibited at the abnormal tray.

Figure 9A:
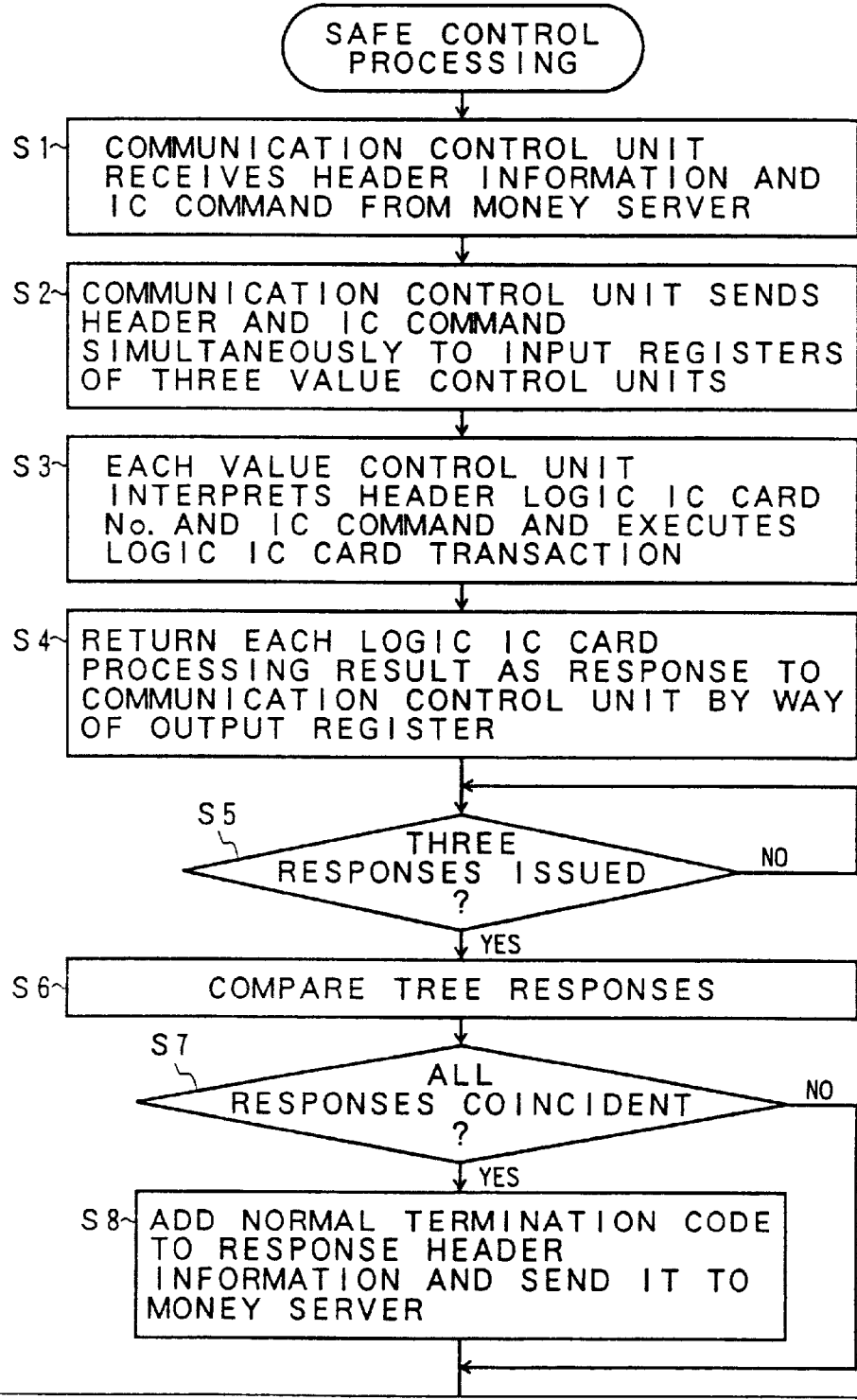
FIGS. 9A and 9B are flowcharts of control processing of the electronic money of the present invention attendant on the load processing of the money server of FIGS. 8A and 8B.
Figure 9B:
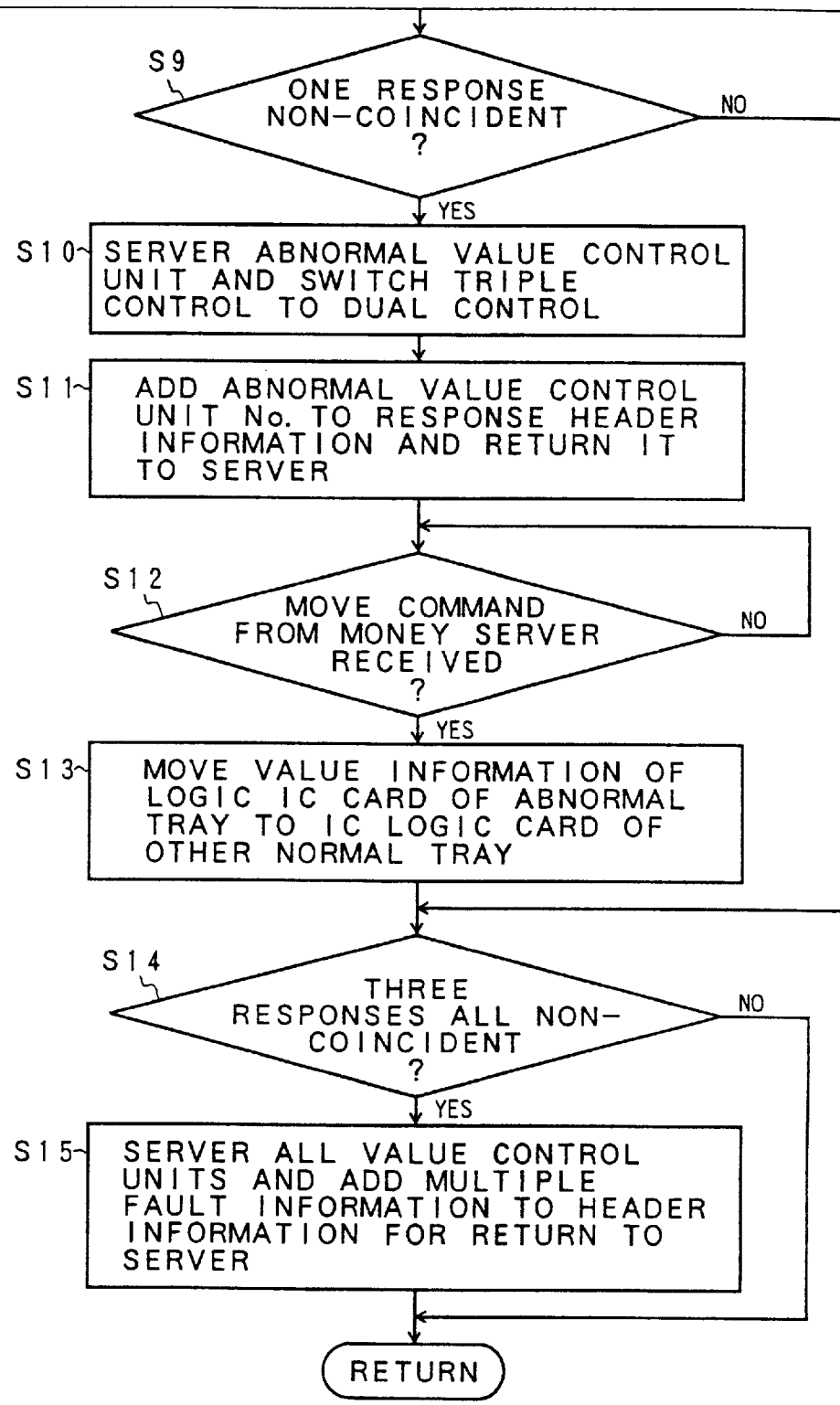

FIGS. 9A and 9B is a flowchart of safe control processing on the electronic money safe 10 side corresponding to the processing of the money server 18 of FIGS. 8A and 8B. When in step S1 the communication control unit 50 receives the header information 122 and the IC command from the money server 18, in step S2 the communication control unit 50 sends at the same time the header information 122 and the IC command to the input registers of the three value control units 60-1 to 60-3. In step S3, the value control units 60-1 to 60-3 interpret the logic IC card number and the IC command from the header information 122, and execute a transaction based on the IC command with the logic IC card having a specified number. Then in step S4, the processing results of the logic IC cards are returned as the IC responses 124-1 to 124-3 to the communication control unit 50 by way of the output registers. In step S5, the triple comparison module 84 waits until the three responses from the value control units 60-1 to 60-3 are all obtained, and when the three responses are all obtained, a comparison control of the three responses is made in step S6. If as a result of this comparison control, all of the responses are coincident with one another in step S7, then in step S8 a normal termination code is added to the header information 122 of the response, which is sent to the money server 18. If in step S7 all of the responses are not coincident with one another, then in step S9 it is judged whether one response is not coincident or not. If one response is non-coincident, then in step S10 a value control unit which has suffered from abnormality is severed and the triplication control is switched to the dualization control. Then in step S11, the number of the value control unit which has suffered from the abnormality is added to the header information 122, which is returned to the money server 18 together with the correct response. Then in step S12, a value transfer command from the money server 18 is waited, and when the transfer command is received, in step S13 the value information of the logic IC card of the abnormal tray is transferred to the logic IC card of the other correct tray. If in step S9 one response is not non-coincident with one another, then the procedure goes to step S14 in which a check is made to see if all of the three responses are non-coincident with one another or not. If all are non-coincident with one another, then in step S15 all of the value control units 60-1 to 60-3 are severed, and multi-failure information is added to the header information, which is returned to the money server 18.

Figure 10:
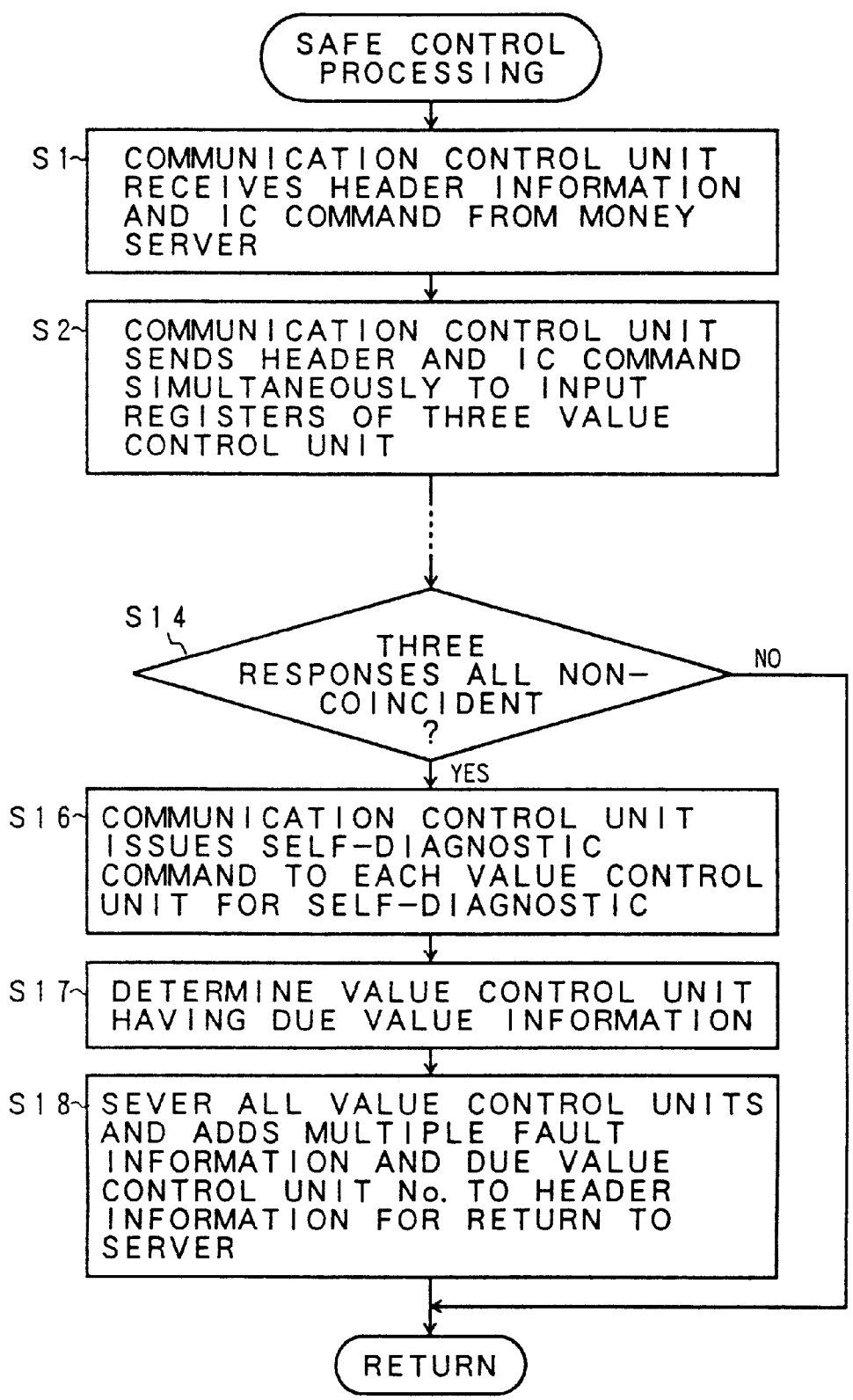
FIG. 10 is a flowchart of other electronic money control processing of the present invention.

FIG. 10 is a flowchart of another embodiment in case all of the three responses result in non-coincidence in the triple comparison control module 84 of the electronic money safe 10 of FIG. 7. This embodiment is characterized in that the communication control unit 50 issues a self-diagnostic command to the value control units 60-1 to 60-3 to allow them to perform the self-diagnosis. More specifically, the steps S1 to S14 of FIG. 10 are the same as the safe control processing of FIGS. 9A and 9B. If in step S14 it is judged that all of the three responses 124-1 to 124-3 are non-coincident with one another, then in step S16 the communication control unit 50 issues a self-diagnostic command to the value control units 60-1 to 60-3, allowing them to perform self-diagnosis. Through this self-diagnostic of the value control units 60-1 to 60-3, a correctness check is made from value of a work area of the RAM 68-1, information of the electronic money of RAM 70-1, transaction record, error information and so forth. As a result of this, the value control unit having correct value information is determined in step S17. Then in step S18, all of the value control units 60-1 to 60-3 are severed, and thereafter the number of the correct value control unit determined by the multi-failure information and the self-diagnosis is added to the header information 122, and the response 124 is returned to the money server 18.

Figure 11:
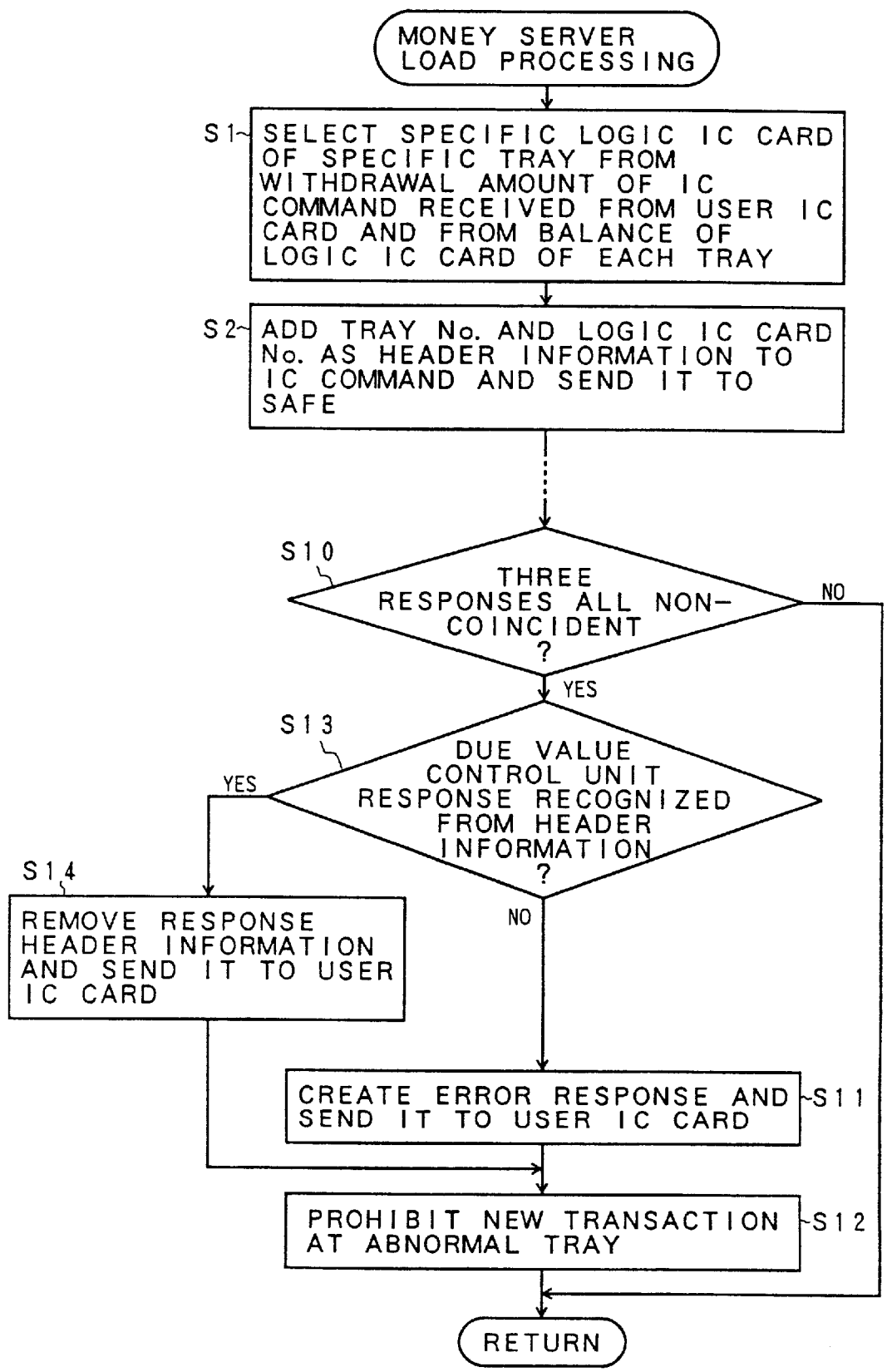
FIG. 11 is a flowchart of load processing of the money server attendant on the electronic money control processing of FIG. 10.

FIG. 11 is a flowchart of the load processing corresponding to the safe control processing of FIG. 10. In this flowchart, the processing of steps S1 to S10 is the same as FIGS. 8A and 8B. If in step S10 it is judged that all of the three responses are non-coincident with one another, then in step S13 a check is made to see if a response of a correct value control unit based on the self-diagnosis is recognized or not from the header information. When it is recognized to be a response of the correct value control unit form the result of the self-diagnosis, in step S14 the response is cleared of the header information 122 and is sent to the IC card on the user side in the same manner as the case of the normal termination. Then in step S12, a new transaction is inhibited at the abnormal tray. It is to be noted that if in step S13 a response of the correct value control unit based on the self-diagnosis is not recognized, then in step S11 an error response is created and sent to the IC card of the user. In this case, by performing the decision by majority through the triplication processing by the triple comparison control module 84 provided in each tray of the electronic money safe 10 of the present invention, an extremely high reliability can be realized as compared with the conventional electronic money safe using a physical IC card. For example, in cases where the functions of the 32 IC cards are logically implemented by each of pairs of the tripled command control units 98-1 to 98-3 and the non-volatile memories 100-1 to 100-3 as the case of the tray 12-1 of FIGS. 6A and 6B, the failure rate in the case of triplication is given as $$6\times 2000^2 \times 24 \times 10^{-9} = 0.576 \text{fit}$$

where pre-multiplication circuit failure rate is 2000 fit, with mean time to repair (MTTR) equaling 24 hours. On the other hand, the failure rate of the 32 IC cards provided in the conventional electronic money safe is expressed as $$100 \times 32 = 3200 \text{fit}$$

Thus, the failure rate of the present invention in the case of triplication can be suppressed to $\frac{1}{5,000}$ or below as compared with the electronic money safe using the conventional IC cards.

A further reduction in the failure rate can be effected if the extinction of the value attributable to the multi-failure is prevented by transferring the value information of the logic IC card of the abnormal tray to the logic IC card of the other normal tray in cases where one response is non-coincident as in step S9 of FIG. 9A. For example, if an assumption is made that the value can automatically be transferred to the normal tray within one minute upon the detection of the failure, the mean time to repair (MTTR) results in 1/60H, and the failure rate of the tripled configuration in this case is given as $$6 \times 2000^2 \times 1/60 \times 10^{-9} = 0.0004 \text{fit}$$

In this case, the failure rate can be reduced to 1/80,000,000 as compared with the conventional electronic money safe using 32 IC cards.

Figure 12:
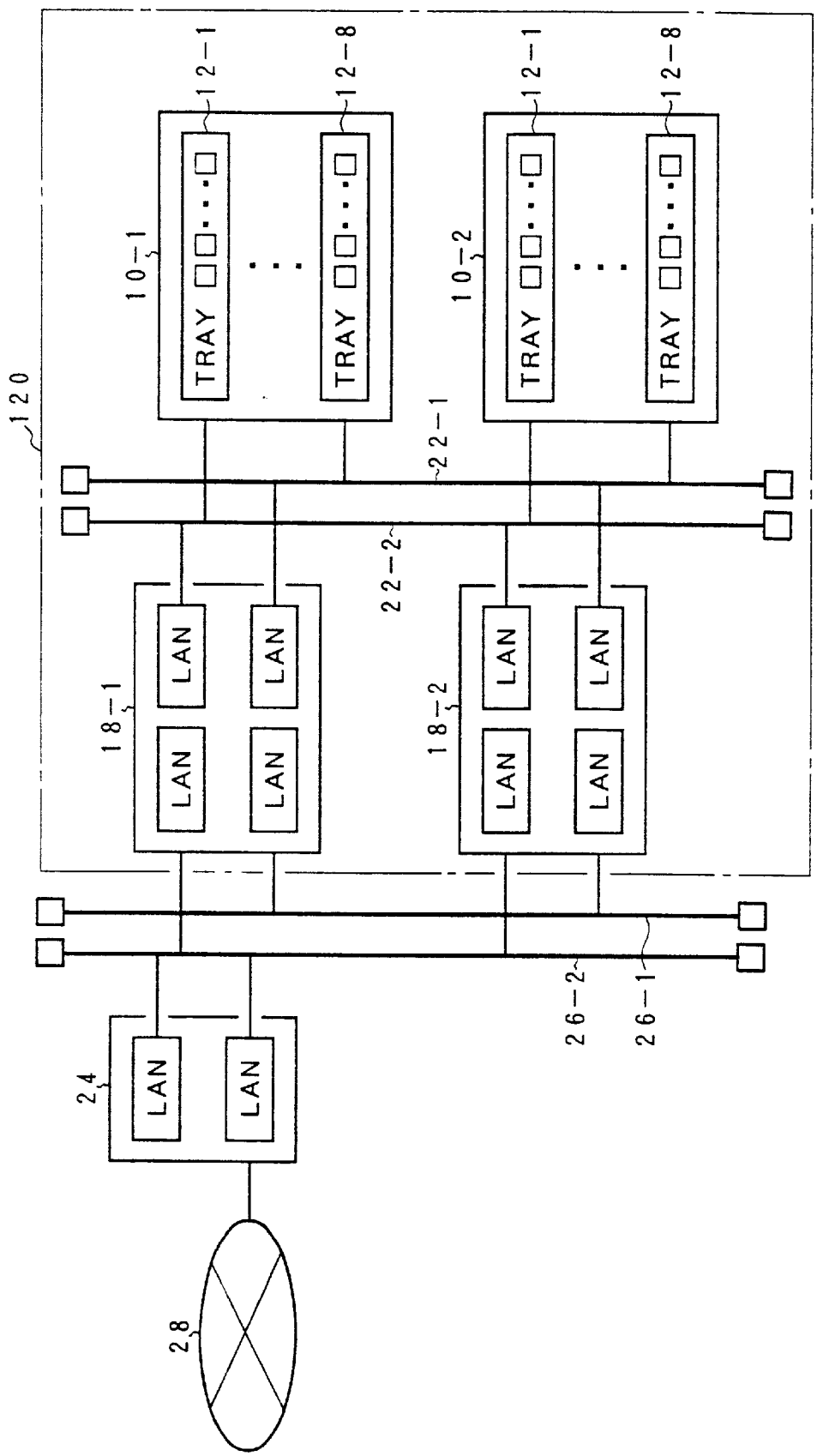
FIG. 12 is a block diagram of a medium-scale electronic money system including two electronic money safes.

FIG. 12 illustrates another system form of the electronic money system using the electronic money safe of the present invention. This system is a medium-scale system in which the number of the user IC cards is of the order of 2,400,000. In the case of this medium-scale system, a system unit 120 on the bank side is provided with two electronic money safes 10-1 and 10-2. The electronic money safes 10-1 and 10-2 are each provided with eight trays 12-1 to 12-8 at the maximum configuration. The trays 12-1 to 12-8 are each provided with 32 logic IC cards. The two electronic money safes 10-1 and 10-2 are connected via LANs 22-1 and 22-2 to two money servers 18-1 and 18-20, which are connected via LANs 26-1 and 26-2 to a network 28 by a router 24, thereby providing a connection to the load terminals on the network 28 side and to appropriate input/output terminals.

Figure 13:
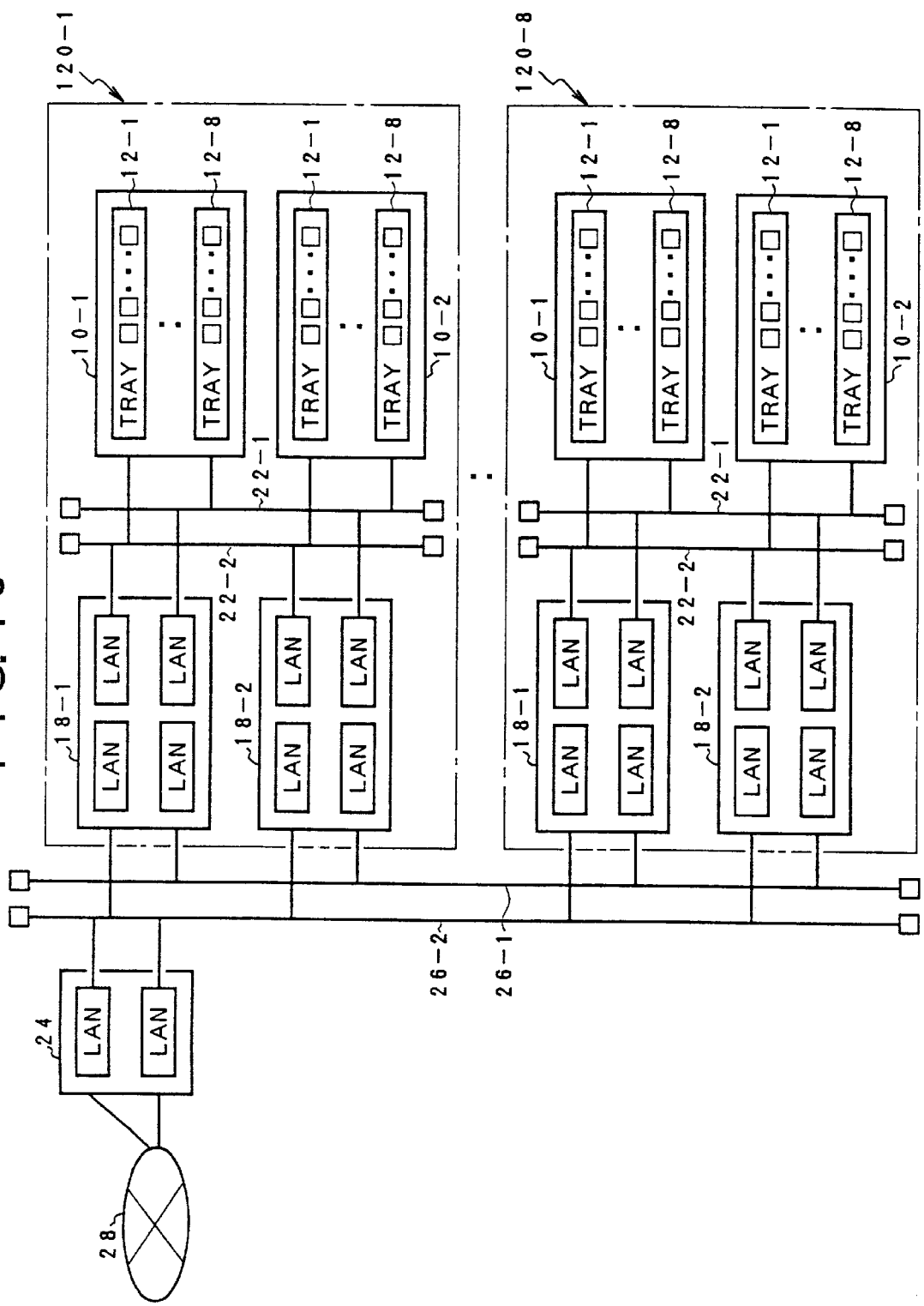
FIG. 13 is a block diagram of a large-scale electronic money system including 32 electronic money safes at its maximum configuration.

FIG. 13 illustrates a large-scale system in which the number of the user IC cards is of the order of 20,000,000. The bank side is provided with eight system units 120-1 to 120-8 corresponding to the system unit 120 provided in the medium-scale system of FIG. 13. In this manner, the electronic money safe of the present invention allows the number of trays and the number of safes to be appropriately determined in correspondence with the number of user IC cards.

According to the present invention described above, it is possible to easily make a change of the cryptographic processing for the security of the electronic money safe by logically implementing the functions of a plurality of IC cards using a single control circuit as the electronic money safe. Furthermore, by using a memory having a less power consumption and an elongated rewriting life such as the static RAM backed up by a battery as the value storage as the electronic money safe, it is possible to remarkably elongate the service life of the logic IC card for use in the electronic money safe as compared with the conventional IC cards. Furthermore, by multiplexing the control circuit in the electronic money safe, a remarkable improvement in the reliability can be achieved as compared with the case in which the IC cards have been provided for the electronic money safe. Furthermore, by transferring the value to the other normal control circuit in response to a partial defect detection in the multi-comparison control in the transaction processing of the electronic money safe, it is possible to prevent in advance the extinction of the value in cases where a multi-failure has occurred in the multi-comparison control.

Although the above embodiments have employed 32 logic IC cards per tray by way of example, the processing speed of the processor provided in the tray may be increased to add to the number of processes, and correspondingly to further add to the number of the logical IC cards. It is therefore to be appreciated that the number of the logic IC cards per tray is not limited to the above embodiments but can be appropriately determined.

Although the above embodiments have employed by way of example the static RAM backed up by a battery as the non-volatile memory of the logic IC card for use in the tray, the other memory could also be used as long as it consumes a lower power in the memory holding state and has an elongated service life. It is also to be noted that the present invention is not restricted by the numerical values shown in the above embodiments.

The above and other objects, features and advantages of the present invention will become more apparent from the following detailed description with reference to the accompanying drawings.

What is claimed is:

1. A safe for keeping electronic money representing a currency value in the form of electronic information, said safe comprising:

a non-volatile memory having therein arranged a plurality of IC card storage units logically representing a plurality of IC cards storing said electronic money;

a command control unit for executing concurrently commands imparted to said plurality of IC card storage units arranged in said non-volatile memory to thereby logically implement a control function of each of said plurality of IC cards; and a communication control unit which, upon a receipt of a single or a plurality of commands from a host apparatus, forms concurrently communication paths corresponding in numbers to said commands and extending to said command control unit to thereby logically implement a communication function of each said plurality of IC cards; and one or more trays each having a multiplex configuration in which a plurality of value control units are provided for said communication control unit, said plurality of value control units each consisting of a combination of said non-volatile memory and said command control unit, wherein said communication control unit includes a multi-comparison control unit which allows said command control units provided in said plurality of value control units to perform the same processing for said IC card storage units in response to commands from said host apparatus, said multi-comparison control unit comparing a plurality of results of processing for judgment.

2. A safe according to claim 1, wherein when comparing said results of processing from said plurality of value control units and detecting that all of them are coincident with one another, said multi-comparison control unit judges normal termination and posts said host apparatus on said results of processing.

3. A safe according to claim 1, wherein when comparing said results or processing from said plurality of value control units and detecting that one result of processing is not coincident with the other results of processing, said multi-comparison control unit posts said host apparatus on results of processing which have coincided with each other.

4. A safe according to claim 1, wherein when comparing said results of processing from said plurality of value control units and detecting that one result of processing is not coincident with the other results of processing, said multi-comparison control unit inhibits a control on said value control unit which has caused non-coincidence.

5. A safe according to claim 1, wherein when comparing said results of processing from said plurality of value control units and detecting that one result of processing is not coincident with the other results of processing, said multi-comparison control unit inhibits a control from said host apparatus on a tray containing said value control unit which has caused non-coincidence, and thereafter, under the control of said host apparatus, transfers electronic money stored in said non-volatile memory of said tray containing said value control unit which has caused non-coincidence to said non-volatile memory of another coincident tray.

6. A safe according to claim 1, wherein when comparing said results of processing from said plurality of value control units and detecting that all of them are not coincident with one another or detecting at least three different results of processing, said multi-comparison control unit judges abnormal termination and posts said host apparatus on a processing error.

7. A safe according to claim 1, wherein when comparing said results of processing from said plurality of value control units and detecting that all of them are not coincident with one another or detecting at least three different results of processing, said multi-comparison control unit judges abnormal termination, posts said host apparatus on multi-failure information and severs a tray which has suffered from abnormality from objects to be processed.

8. A safe according to claim 1, wherein when comparing said results of processing from said plurality of value control units and detecting that all of them are not coincident with one another or detecting at least three different results of processing, said multi-comparison control unit causes said plurality of value control units to perform self-diagnosis to judge a correct result of processing, posts said host apparatus on said correct result of processing and on multi-failure information and severs a tray which has suffered from abnormality from objects to be processed.

9. A safe for keeping electronic money representing a currency value in the form of electronic information, said safe comprising:

a non-volatile memory having therein arranged a plurality of IC card storage units logically representing a plurality of IC cards storing said electronic money;

a command control unit for executing concurrently commands imparted to said plurality of IC card storage units arranged in said non-volatile memory to thereby logically implement a control function of each of said plurality of IC cards; and a communication control unit which, upon a receipt of a single or a plurality of commands from a host apparatus, forms concurrently communication paths corresponding in numbers to said commands and extending to said command control unit to thereby logically implement a communication function of each of said plurality of IC cards;

one or more trays each having a tripled configuration in which three value control units are provided for said communication control unit, said three value control units each consisting of a combination of said non-volatile memory and said command control unit.

wherein said communication control unit includes a triple-comparison control unit which allows said command control units to perform the same processing for said IC card storage units in response to commands from said host apparatus, said triple-comparison control unit comparing a plurality of results of processing for judgment.

10. A safe according to claim 9, wherein when comparing said results of processing from said plurality of value control units and detecting that all of them are coincident with one another, said triple-comparison control unit judges normal termination and posts said host apparatus on said results of processing.

11. A safe according to claim 9, wherein when comparing said results of processing from said three value control units and detecting that one result of processing is not coincident with the other results of processing, said triple-comparison control unit posts said host apparatus on results of processing which have coincided with each other.

12. A safe according to claim 9, wherein when comparing said results of processing from said three value control units and detecting that one result of processing is not coincident with the other results of processing, said triple-comparison control unit inhibits a control on said value control unit which has caused non-coincidence.

13. A safe according to claim 9, wherein when comparing said results of processing from said three value control units and detecting that one result of processing is not coincident with the other results of processing, said triple-comparison control unit inhibits a control from said host apparatus on a tray containing said value control unit which has caused non-coincidence, and thereafter, under the control of said host apparatus, transfers electronic money stored in said non-volatile memory of said tray containing said value control unit which has caused non-coincidence to said non-volatile memory of another coincident tray.

14. A safe according to claim 9, wherein when comparing said results of processing from said three value control units and detecting that all of them are not coincident with one another, said triple-comparison control unit judges abnormal termination and posts said host apparatus on a processing error.

15. A safe according to claim 9, wherein when comparing said results of processing from said three value control units and detecting that all of them are not coincident with one another, said triple-comparison control unit judges abnormal termination, posts said host apparatus on triple-failure information and severs a tray which has suffered from abnormality from objects to be processed.

16. A safe according to claim 9, wherein when comparing said results of processing from said plurality of value control units and detecting that all of them are not coincident with one another, said triple-comparison control unit causes said three value control units to perform self-diagnosis to judge a correct result of processing, posts said host apparatus on said correct result of processing and on triple-failure information and severs a tray which has suffered from abnormality from objects to be processed.

* * * * *